(12) United States Patent
Gradischer

(10) Patent No.: US 9,151,429 B2
(45) Date of Patent: Oct. 6, 2015

(54) FLOW RESTRICTOR

(71) Applicant: Hamilton Sundstrand Corporation, Charlotte, NC (US)

(72) Inventor: Glenn Gradischer, Canton, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 223 days.

(21) Appl. No.: 13/910,736

(22) Filed: Jun. 5, 2013

(65) Prior Publication Data

US 2014/0360609 A1    Dec. 11, 2014

(51) Int. Cl.
*G05D 7/01*       (2006.01)
*F16L 55/027*     (2006.01)
*F15D 1/02*       (2006.01)

(52) U.S. Cl.
CPC ............... *F16L 55/027* (2013.01); *F15D 1/025* (2013.01)

(58) Field of Classification Search
CPC ............................... F15D 1/025; F16L 55/027
USPC .................. 138/37, 39, 40–46; 137/504, 517, 137/269.5, 493.9
See application file for complete search history.

(56) References Cited

U.S. PATENT DOCUMENTS

| | | | |
|---|---|---|---|
| 2,929,248 A | 3/1960 | Sprenkle | |
| 3,110,162 A | 11/1963 | Gerteis | |
| 3,628,329 A * | 12/1971 | Spencer | 60/794 |
| 3,920,035 A * | 11/1975 | Werner | 137/115.05 |
| 3,983,903 A * | 10/1976 | Kuehn, Jr. | 138/40 |
| 4,155,535 A * | 5/1979 | Seamone | 251/282 |
| 4,203,459 A * | 5/1980 | Boschung | 137/119.03 |
| 4,664,139 A * | 5/1987 | Pfeiffer | 137/240 |
| RE33,053 E * | 9/1989 | Seger | 251/121 |
| 5,429,304 A * | 7/1995 | Tomita et al. | 239/119 |
| 6,327,844 B1 | 12/2001 | Kaminske | |
| 6,418,970 B1 * | 7/2002 | Deul | 138/31 |
| 6,539,977 B1 | 4/2003 | Hutchinson et al. | |
| 8,746,287 B2 * | 6/2014 | Dorr et al. | 138/31 |

FOREIGN PATENT DOCUMENTS

| | | |
|---|---|---|
| DE | 1801447 A1 | 6/1969 |
| GB | 683401 A | 11/1952 |
| WO | 9508064 A1 | 3/1995 |

OTHER PUBLICATIONS

The European Search Report mailed Apr. 13, 2015 for European Application No. 14163685.2.

* cited by examiner

*Primary Examiner* — Patrick F Brinson
(74) *Attorney, Agent, or Firm* — Kinney & Lange, P.A.

(57) ABSTRACT

A flow restrictor includes a first disc and a second disc. A rod extends between the first disc and the second disc and spaces the first disc from the second disc. A first hole is formed in the first disc.

17 Claims, 2 Drawing Sheets

FLOW RESTRICTOR

BACKGROUND

The present invention is generally related to flow restrictors.

Fuel metering units, pneumatic systems, and lubrication systems in gas turbine engines commonly use a flow restrictor to restrict and regulate the flow of fluids through fluid passages. A flow restrictor is generally a cylindrical tube disposed inside a fluid passage and includes an internal profile that reduces the diameter of the flow area in the fluid passage, similar to a venturi tube. Some flow restrictors are installed inside the fluid passage through an interference fit while others are installed through intricate retaining systems.

If the flow restrictor and retaining system are misassembled inside the fluid passage, the retaining system may fail and permit the flow restrictor to shift and move inside the fluid passage. Engine vibrations, over time, may also loosen the interference fit or retaining system between the flow restrictor and the fluid passage, thereby allowing the flow restrictor to shift and move within the fluid passage. If the flow restrictor shifts or moves inside the fluid passage, the flow restrictor could undesirably block inlet and outlet orifices connected to the fluid passage. The flow restrictor could also move to a position inside the fluid passage where the flow restrictor is no longer operable in restricting or regulating the flow of fluid inside the fluid passage. This problem has been overcome in the past by permanently fixing the flow restrictor inside the fluid line through the use of an adhesive or braze. However, permanently fixing the flow restrictor inside the fluid passage prevents an operator from easily replacing the restrictor in the future should the operator wish to subsequently adjust the flow in the fluid passage by installing a flow restrictor with a larger or smaller interior profile.

SUMMARY

According to the present invention, a flow restrictor includes a first disc and a second disc. A rod extends between the first disc and the second disc and spaces the first disc from the second disc. A first hole is formed in the first disc.

In another embodiment of the present invention, a flow assembly includes a flow passage that extends between a first end and a second end, and an inlet is formed in the flow passage between the first end and the second end of the flow passage. A flow restrictor seat is disposed along the flow passage between the inlet and the second end of the flow passage, and a flow restrictor is disposed in the flow passage between the first end of the flow passage and the flow restrictor seat. The flow restrictor includes a first disc disposed between the inlet and the flow restrictor seat and against the flow restrictor seat. The flow restrictor also includes a second disc disposed between the first end of the flow passage and the inlet. A rod extends between the first disc and the second disc and spaces the first disc from the second disc. A first hole is formed in the first disc.

In another embodiment of the present invention, a flow assembly includes a flow passage that extends between a first end and a second end. A flow restrictor is disposed in the flow passage and includes a first disc, a second disc disposed opposite the first disc, and a rod extending between the first disc and the second disc. The rod spaces the first disc from the second disc. At least one hole is formed in the first disc. An inlet is formed in the flow passage between the first disc and the second disc.

DETAILED DESCRIPTION

The present invention provides a flow restrictor disposed between a first end and a second end of the flow passage. The first end of the flow passage is stopped to provide a fluid-tight, sealed end. The flow restrictor includes a first disc opposite a second disc, and a rod extending between the first disc and the second disc. An inlet is formed in the flow passage between the first disc and the second disc, and holes are formed in the first disc and the second disc to allow fluid flowing from the inlet into the flow passage to flow across the flow restrictor. Should the flow restrictor move or shift positions inside the flow passage and cause the first disc to move toward the inlet, the second disc can abut against the stopped first end of the flow passage and stop the first disc from progressing inside the flow passage and covering the inlet. The first disc and the second disc can be symmetrical so as to preclude an operator from misassembling the flow restrictor in the flow passage.

Figure 1:
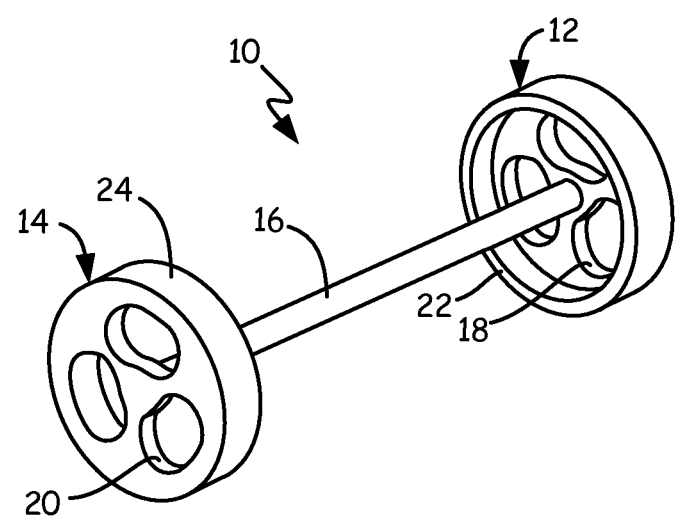
FIG. 1 is a perspective view of a flow restrictor.

FIG. 1 is a perspective view of an embodiment of flow restrictor 10. As shown in FIG. 1, flow restrictor 10 includes first disc 12, second disc 14, rod 16, first plurality of holes 18, second plurality of holes 20, first cylindrical rim 22, and second cylindrical rim 24. First disc 12 and second disc 14 are equal in diameter in the illustrated embodiment. Rod 16 is a solid, cylindrical bar that extends between first disc 12 and second disc 14 and spaces first disc 12 opposite from second disc 14. First disc 12 and second disc 14 can be centered on opposite ends of rod 16 such that first disc 12, second disc 14 and rod 16 are coaxially aligned.

Figure 2:
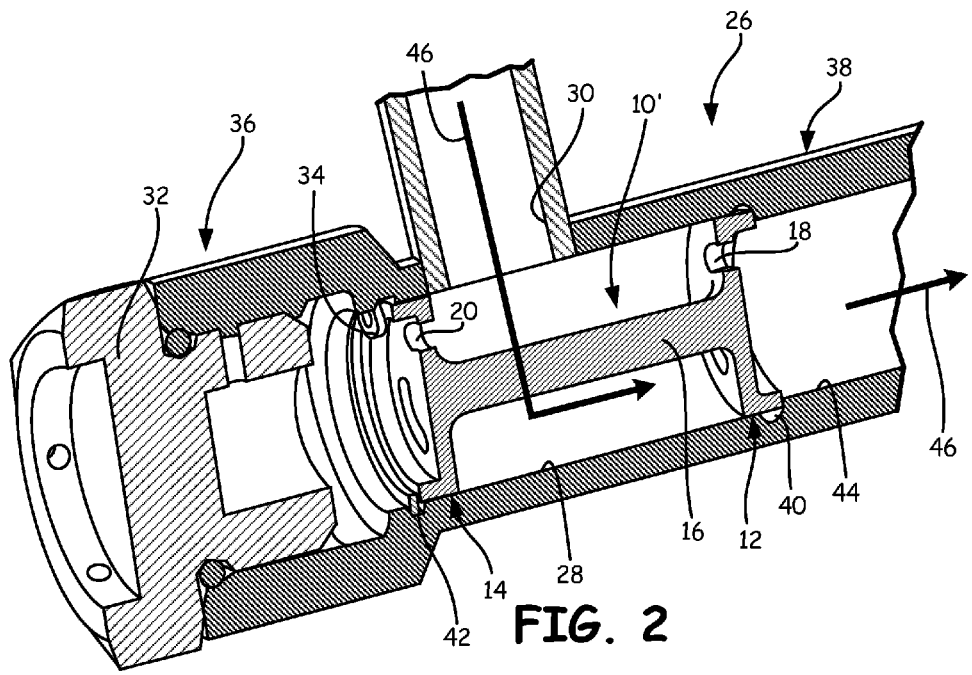
FIG. 2 is a cross-sectional view of a flow passage in which the flow restrictor of FIG. 1 is disposed in a first position.
Figure 3:
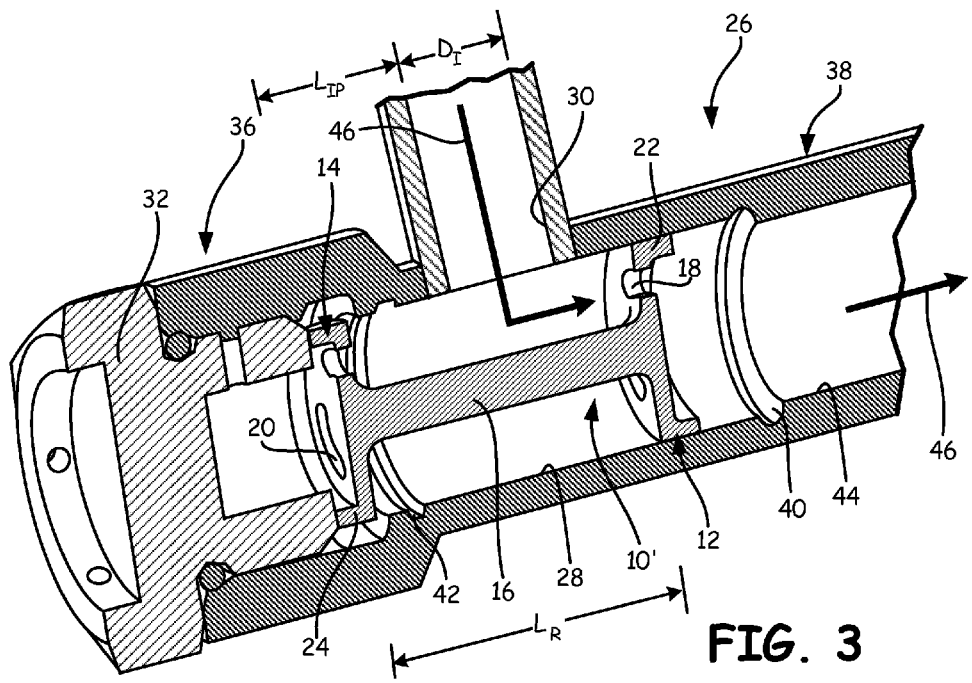
FIG. 3 is a cross-sectional view of the flow passage of FIG. 2 in which the flow restrictor is disposed in a second position.

First cylindrical rim 22 can be formed around first disc 12 and second cylindrical rim 24 can be formed around second disc 14. First cylindrical rim 22 extends axially from first disc 12 in a first direction that can be arranged parallel with a central axis of rod 16. As shown in FIG. 1, first cylindrical rim 22 extends axially from first disc 12 towards second disc 14. Second cylindrical rim 24 can extend axially from second disc 14 in a direction opposite the first direction. As shown in FIG. 1, second cylindrical rim 24 extends axially from second disc 14 towards first disc 12. The directions of first cylindrical rim 22 and second cylindrical rim 24 can be reversed such that first cylindrical rim 22 and second cylindrical rim 24 extend axially away from first disc 12 and second disc 14 in opposite directions, such as shown in the embodiment of FIGS. 2 and 3. Because second cylindrical rim 24 extends axially from second disc 14 in a direction opposite from the direction that first cylindrical rim 22 extends, second disc 14 and second cylindrical rim 24 are symmetric on rod 16 to first disc 12 and first cylindrical rim 22.

First plurality of holes 18 is formed in first disc 12 and second plurality of holes 20 is formed in second disc 24. First plurality of holes 18 can be equal in size and number to second plurality of holes 20 so as to maintain the symmetry between first disc 12 and second disc 14. The individual holes of first plurality of holes 18 can be distributed on first disc 12 such that the individual holes of first plurality of holes 18 are in a commonly aligned clocking arrangement around the center of first disc 12 where rod 16 joins first disc 12. The individual holes of second plurality of holes 20 may be distributed on second disc 14 in a similar manner, such that the individual holes of second plurality of holes 20 are in a commonly aligned clocking arrangement around the center of second disc 14 where rod 16 joins second disc 14. As shown in FIG. 1, both first plurality of holes 18 and second plurality of holes 20 each include three holes with a kidney-shaped perimeter. In further embodiments, first plurality of holes 18 and second plurality of holes 20 could each include more than three holes or less than three holes without departing from the scope of the present invention.

FIGS. 2 and 3 will be discussed concurrently. FIG. 2 is a cross-sectional view of flow assembly 26 with flow passage 28 and flow restrictor 10' disposed in a first position. FIG. 3 is a cross-sectional view of flow assembly 26 with flow passage 28 and flow restrictor 10' disposed in a second position. As shown in FIGS. 2 and 3, flow assembly 26 includes flow restrictor 10', flow passage 28, inlet 30, diameter $D_I$ of inlet 30, plug 32, distance $L_{IP}$ between plug 32 and inlet 30, and retaining ring 34. Flow restrictor 10' includes first disc 12, second disc 14, rod 16, length $L_R$ of rod 16, first plurality of holes 18, second plurality of holes 20, first cylindrical rim 22, and second cylindrical rim 24. Flow passage 28 includes first end 36, second end 38, flow restrictor seat 40, retaining ring seat 42, and reduced inner diameter portion 44. Fluid 46 can flow through flow assembly 26 during operation.

In FIGS. 2 and 3, components of like numbering with the components of FIG. 1 are assembled as discussed above with reference to FIG. 1. Retaining ring 34, while present in the embodiment of FIG. 2, is omitted from the embodiment of FIG. 3. Flow restrictor 10 from the embodiment of FIG. 1 can also be used in place of flow restrictor 10'. Flow assembly 26 can be part of a larger assembly, such as a fuel metering unit, a lubrication system, or a pneumatic cooling system in a gas turbine engine. Flow passage 28 extends between first end 36 and second end 38. As shown in the embodiment of FIG. 1, first end 36 is upstream from second end 38. Inlet 30 is formed in flow passage 28 between first end 36 and second end 38 of flow passage 28. Inlet 30 is an orifice that allows fluid 46 to enter flow passage 28 between first end 36 and second end 38. Fluid 46 enters flow passage 28 through inlet 30 and turns at a right angle inside flow passage 28 before flowing through first plurality of holes 18 of first disc 12 and towards second end 38 of flow passage 28. Reduced inner diameter portion 44 can be formed along flow passage 28 downstream from inlet 30 and reduces the inner diameter of flow passage 28. Flow restrictor seat 40 can be a shelf created by reduced inner diameter portion 44 and is disposed along flow passage 28 between inlet 30 and second end 38 of flow passage 28. A groove can also be formed in flow passage 28 immediately upstream from flow restrictor seat 40 so as to reduce the risk of stress concentrations forming between flow passage 28 and flow restrictor seat 40. Flow restrictor 10' is inserted into flow passage 28 through first end 36 such that first disc 12 abuts against flow restrictor seat 40 and first disc 12 is disposed between inlet 30 and flow restrictor seat 40. Second disc 14 can be disposed on the opposite side of inlet 30 from first disc 12 such that second disc 14 is disposed between first end 36 of flow passage 28 and inlet 30, and inlet 30 is disposed between first disc 12 and second disc 14. The outer diameters of both first disc 12 and second disc 14 can be approximately equal to the inner diameter of flow passage 28 upstream from flow restrictor seat 40.

The symmetry between first disc 12, first cylindrical rim 22, second disc 14, and second cylindrical rim 24 discussed above with reference to FIG. 1 is significant because it reduces confusion during the assembling of flow restrictor 10' into flow assembly 26 because an operator does not have to worry about which end of flow restrictor 10' is inserted first into flow assembly 26. First cylindrical rim 22 and second cylindrical rim 24 also help reduce the risk of first disc 12 or second disc 14 binding during assembly by aligning flow restrictor 10' as it is installed in flow assembly 26. First cylindrical rim 22 and second cylindrical rim 24 also allow for nearly cantilevered support of flow restrictor 10' in the event flow restrictor 10' moves within flow passage 28 and one of first disc 12 or second disc 14 enters an expanded diameter portion of flow passage 28, as illustrated in the embodiment of FIG. 3. First cylindrical rim 22 also stiffens first disc 12 against deformation and bending moments that may occur as flow restrictor 10' is assembled into flow assembly 26, shown in FIGS. 2 and 3. Similarly, second cylindrical rim 24 stiffens second disc 14. First plurality of holes 18 in disc 12 has a combined area smaller than an area of inlet 30 such that first plurality of holes 18 restricts the flow of fluid 46 as it flows from inlet 30, across flow restrictor 10', and towards second end 38 of flow passage 28. As discussed above with reference to FIG. 1, second plurality of holes 20 can be symmetric to first plurality of holes 18, thereby allowing second disc 14 to function similar to first disc 12 should the position of flow restrictor 10' inside flow passage 28 be reversed during the assembling of flow assembly 26.

Retaining ring seat 42 is formed along flow passage 28 between first end 36 of flow passage 28 and second disc 14. Retaining ring seat 42 can be a circumferential slot formed on the inner surface of flow passage 28 between inlet 30 and first end 36 of flow passage 28. Retaining ring 34 can be disposed in retaining ring seat 42 and restricts axial movement of flow restrictor 10' along flow passage 28 between retaining ring seat 42 and flow restrictor seat 40. Retaining ring 34 can be a bowed retaining ring that abuts second disc 14 or second cylindrical rim 24 and exerts a load on flow restrictor 10'. A bowed retaining ring is a retaining ring that is curved in a manner similar to that of a Belleville washer. By exerting a load on flow restrictor 10', bowed retaining ring 34 pinches flow restrictor 10' between flow restrictor seat 40 and retaining ring 34 such flow restrictor 10' is unable to rattle or spin inside flow passage 28 as fluid 46 flows across flow restrictor 10'.

Plug 32 can be removably attached (e.g., threaded) to first end 36 of flow passage 28 and seals first end 36 of flow passage 28. Because plug 32 is removably attached, plug 32 serves as an access point to flow passage 28 that can be subsequently removed from first end 36 if there is a need to access or replace flow restrictor 10'.

As describe above in reference to FIG. 1, rod 16 extends between first disc 12 and second disc 14. Length $L_R$ of rod 16, defined between first disc 12 and second disc 14, can be longer than diameter $D_I$ of inlet 30. As shown in FIGS. 2 and 3, length $L_R$ of rod 16, defined between first disc 12 and second disc 14, is approximately twice as long as diameter $D_I$ of inlet 30. Inlet 30 is spaced on flow passage 28 from plug 32 distance $L_{IP}$, which is less than length $D_I$ of rod 16. Additionally, diameter $D_I$ of inlet 30 combined with distance $L_{IP}$ between plug 32 and inlet 30 is also smaller than length $L_R$ of rod 16. Because length $L_R$ of rod 16 is longer than diameter $D_I$ of inlet 30, and because inlet 30 is spaced on flow passage 28 from plug 32 distance $L_{IP}$, distance $L_{IP}$ being less than length $L_R$ of rod 16, first disc 12 is incapable of blocking inlet 30 should retaining ring 34 somehow fail or be omitted from flow assembly 26 and flow restrictor 10' moves inside flow passage 28 toward plug 32. Length $L_R$ of rod 16 and distance $L_{IP}$ of inlet 30 relative plug 32 also helps ensure that first disc 12 remains positioned between inlet 30 and second end 38 of flow passage 28 where first disc 12 can continue to restrict the flow of fluid 46 as it passes from inlet 30 to second end 38 of flow passage 28. Flow restrictor 10' can be formed from a 300 series stainless steel to protect flow restrictor 10' from corrosion and to also impart flow restrictor 10' with enough durability and strength to resist erosion and deformation.

In view of the foregoing description, it will be recognized that the present disclosure provides numerous advantages and benefits. For example, the present disclosure provides flow assembly 26 with flow restrictor 10, flow restrictor 10 including rod 16 that extends between symmetrical discs 12 and 14. Because flow restrictor 10 is symmetrical, there is less confusion during the assembling of flow assembly 26 over prior art assemblies as it is no longer important whether the operator inserts a certain end of flow restrictor 10 into flow passage 28 first. In addition, flow restrictor 10 continues to restrict the flow of fluid 46 inside flow passage 28 even when retaining ring 34 fails or is omitted. Flow restrictor 10 also is incapable of blocking or obstructing inlet 30 in the situation that retaining ring 34 fails or is omitted during assembly of flow assembly 26. Flow restrictor 10 is also simple to remove from flow passage 28 should the need subsequently arise.

The following are non-exclusive descriptions of possible embodiments of the present invention.

In one embodiment, a flow restrictor includes a first disc and a second disc. A rod extends between the first disc and the second disc and spaces the first disc from the second disc. A first hole is formed in the first disc.

The flow restrictor of the preceding paragraph can optionally include, additionally and/or alternatively, any one or more of the following features, configurations and/or additional components:

A first plurality of holes is formed in the first disc and a second plurality of holes is formed in the second disc; and/or A first cylindrical rim is formed around the first disc. A second cylindrical rim is formed around the second disc. The first cylindrical rim extends axially from the first disc in a first direction and the second cylindrical rim extends axially from the second disc in a direction opposite the first direction.

In another embodiment, a flow assembly includes a flow passage that extends between a first end and a second end, and an inlet is formed in the flow passage between the first end and the second end of the flow passage. A flow restrictor seat is disposed along the flow passage between the inlet and the second end of the flow passage, and a flow restrictor is disposed in the flow passage between the first end of the flow passage and the flow restrictor seat. The flow restrictor includes a first disc disposed between the inlet and the flow restrictor seat and against the flow restrictor seat. The flow restrictor also includes a second disc disposed between the first end of the flow passage and the inlet. A rod extends between the first disc and the second disc and spaces the first disc from the second disc. A first hole is formed in the first disc.

The flow assembly of the preceding paragraph can optionally include, additionally and/or alternatively, any one or more of the following features, configurations and/or additional components:

A second hole is formed in the second disc;

The first disc is symmetric to the second disc;

Outer diameters of both the first disc and the second disc are approximately equal to an inner diameter of the flow passage;

A length of the rod defined between the first disc and the second disc is longer than a diameter of the inlet;

The length of the rod defined between the first disc and the second disc is approximately twice as long as the diameter of the inlet;

A first cylindrical rim is formed around the first disc, a second cylindrical rim is formed around the second disc. The first cylindrical rim extends axially from the first disc in a first direction and the second cylindrical rim extends axially from the second disc in a direction opposite the first direction;

The inlet is spaced on the flow passage from the plug a distance less than the length of the rod;

A retaining ring seat is formed along the flow passage between the first end of the flow passage and the second disc. A retaining ring is disposed in the retaining ring seat. The retaining ring restricts axial movement of the flow restrictor along the flow passage between the retaining ring seat and the flow restrictor seat;

The retaining ring is a bowed retaining ring that exerts a load on the flow restrictor; and/or A length of the flow restrictor is approximately equal to the length of the flow passage between the retaining ring seat and the flow restrictor seat.

In yet another embodiment of the present invention, a flow assembly includes a flow passage that extends between a first end and a second end. A flow restrictor is disposed in the flow passage and includes a first disc, a second disc disposed opposite the first disc, and a rod extending between the first disc and the second disc. The rod spaces the first disc from the second disc. At least one hole is formed in the first disc. An inlet is formed in the flow passage between the first disc and the second disc.

The flow assembly of the preceding paragraph can optionally include, additionally and/or alternatively, any one or more of the following features, configurations and/or additional components:

A flow restrictor seat is disposed in the flow passage and against the first disc;

A portion of the flow passage downstream of the flow restrictor decreases in diameter and at least partially forms the flow restrictor seat;

A retaining ring seat is formed in the flow passage and a bowed retaining ring is disposed in the retaining ring seat. The bowed retaining ring abuts the second disc;

A first plurality of holes are formed in the first disc and a second plurality of holes are formed in the second disc. The first plurality of holes are equal in size and number to the second plurality of holes; and/or The first plurality of holes has a combined area smaller than an area of the inlet.

Any relative terms or terms of degree used herein, such as "about", "approximately", "substantially", "essentially", "generally" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, alignment variations induced operational conditions, and the like.

While the invention has been described with reference to an exemplary embodiment(s), it will be understood by those skilled in the art that various changes may be made and equivalents may be substituted for elements thereof without departing from the scope of the invention. For example, while the specification describes flow assembly 26 as including inlet 30 disposed between first disc 12 and second disc 14 for flow restrictor 10, flow assembly could include an outlet in place of inlet 30, such that fluid 46 is flowing from second end 38, into flow restrictor 10, and into the outlet. Additionally, while the specification describes flow restrictor seat 40 as a shelf created by reduced inner diameter portion 44, flow restrictor seat 40 could also be formed using a snap ring and slot, similar to retaining seat 42 and retaining ring 34. In addition, many modifications may be made to adapt a particular situation or material to the teachings of the invention without departing from the essential scope thereof. For example, while the invention has been described as flow restrictor 10 and flow assembly 26 used in a gas turbine engine, flow restrictor 10 and flow assembly 26 may be adapted for use in a refining process, or any other process or system that requires the need to restrict the flow of a fluid in a flow passage. Therefore, it is intended that the invention not be limited to the particular embodiment(s) disclosed, but that the invention will include all embodiments falling within the scope of the appended claims.

The invention claimed is:

1. A flow restrictor comprising:
   a first disc;
   a second disc;
   a rod extending between the first disc and the second disc, the rod spacing the first disc from the second disc; and
   a first hole formed in the first disc;
   a first cylindrical rim is formed around the first disc; and
   a second cylindrical rim is formed around the second disc, and
   wherein the first cylindrical rim extends axially from the first disc in a first direction and the second cylindrical rim extends axially from the second disc in a direction opposite the first direction.

2. The flow restrictor of claim 1, wherein a first plurality of holes is formed in the first disc and a second plurality of holes is formed in the second disc.

3. A flow assembly comprising:
   a flow passage extending between a first end and a second end;
   an inlet formed in the flow passage between the first end and the second end of the flow passage;
   a flow restrictor seat disposed along the flow passage between the inlet and the second end of the flow passage;
   a flow restrictor disposed in the flow passage between the first end of the flow passage and the flow restrictor seat, the flow restrictor comprising:
      a first disc disposed between the inlet and the flow restrictor seat and against the flow restrictor seat;
      a second disc disposed between the first end of the flow passage and the inlet;
      a rod extending between the first disc and the second disc, the rod spacing the first disc from the second disc;
      a first hole formed in the first disc; and
      a second hole formed in the second disc.

4. The flow assembly of claim 3, wherein the first disc is symmetric to the second disc.

5. The flow assembly of claim 3, wherein outer diameters of both the first disc and the second disc are approximately equal to an inner diameter of the flow passage.

6. The flow assembly of claim 3, wherein a length of the rod defined between the first disc and the second disc is longer than a diameter of the inlet.

7. The flow assembly of claim 6, wherein the length of the rod defined between the first disc and the second disc is approximately twice as long as the diameter of the inlet.

8. The flow assembly of claim 3, wherein a first cylindrical rim is formed around the first disc, a second cylindrical rim is formed around the second disc, and wherein the first cylindrical rim extends axially from the first disc in a first direction and the second cylindrical rim extends axially from the second disc in a direction opposite the first direction.

9. The flow assembly of claim 8, wherein the inlet is spaced on the flow passage from the plug a distance less than the length of the rod.

10. The flow assembly of claim 3, wherein the flow assembly further comprises:
    a retaining ring seat formed along the flow passage between the first end of the flow passage and the second disc;
    a retaining ring disposed in the retaining ring seat; and
    wherein the retaining ring restricts axial movement of the flow restrictor along the flow passage between the retaining ring seat and the flow restrictor seat.

11. The flow assembly of claim 10, wherein the retaining ring is a bowed retaining ring that exerts a load on the flow restrictor.

12. The flow assembly of claim 10, wherein a length of the flow restrictor is approximately equal to the length of the flow passage between the retaining ring seat and the flow restrictor seat.

13. A flow assembly comprising:
    a flow passage extending between a first end and a second end;
    a flow restrictor disposed in the flow passage, the flow restrictor comprising:
       a first disc;
       a second disc disposed opposite the first disc;
       a rod extending between the first disc and the second disc, the rod spacing the first disc from the second disc;
       a first plurality of holes formed in the first disc; and
       a second plurality of holes formed in the second disc, wherein the first plurality of holes are equal in size and number to the second plurality of holes; and
    an inlet formed in the flow passage between the first disc and the second disc.

14. The flow assembly of claim 13, wherein the flow assembly further comprises:
    a flow restrictor seat disposed in the flow passage and against the first disc.

15. The flow assembly of claim 14, wherein a portion of the flow passage downstream of the flow restrictor decreases in diameter and at least partially forms the flow restrictor seat.

16. The flow assembly of claim 13, wherein the flow assembly further comprises:
    a retaining ring seat formed in the flow passage; and
    a bowed retaining ring disposed in the retaining ring seat, the bowed retaining ring abutting the second disc.

17. The flow assembly of claim 13, wherein the first plurality of holes has a combined area smaller than an area of the inlet.

* * * * *